United States Patent
Yao

(10) Patent No.: US 8,209,761 B2
(45) Date of Patent: Jun. 26, 2012

(54) WIRELESS NETWORK SYSTEM, INFORMATION PROVIDING APPARATUS AND WIRELESS TERMINAL

(75) Inventor: Taketsugu Yao, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1135 days.

(21) Appl. No.: 12/076,382

(22) Filed: Mar. 18, 2008

(65) Prior Publication Data

US 2008/0263674 A1   Oct. 23, 2008

(30) Foreign Application Priority Data

Apr. 19, 2007 (JP) ................ 2007-110143

(51) Int. Cl.
*G06F 7/04* (2006.01)
(52) U.S. Cl. ............... 726/26; 726/27; 380/247
(58) Field of Classification Search ............ None
See application file for complete search history.

(56) References Cited

U.S. PATENT DOCUMENTS

| 7,200,675 B2 * | 4/2007 | Wang et al. ............ 709/238 |
| 7,450,009 B2 * | 11/2008 | Doi et al. ............ 340/572.1 |
| 2003/0026268 A1 * | 2/2003 | Navas ............ 370/400 |
| 2004/0181588 A1 | 9/2004 | Wang et al. |

FOREIGN PATENT DOCUMENTS

| JP | 2003-078656 A | 3/2003 |
| JP | 2003-516035 | 5/2003 |
| JP | 2004-166279 A | 6/2004 |
| JP | 2006-352806 A | 12/2006 |

* cited by examiner

*Primary Examiner* — Pramila Parthasarathy
(74) *Attorney, Agent, or Firm* — Rabin & Berdo, P.C.

(57) ABSTRACT

A wireless network system, information providing apparatus and wireless terminal that can prevent the leak of information such as an address of the wireless terminal. A wireless network system includes an information providing apparatus that provides service information over a wireless network, and multiple wireless terminals each of which receives the service information provided from the information providing apparatus. In this case, the information providing apparatus includes destination possibility data in the service information, and each of the wireless terminals determines the destination possibility that the destination of the provided service information is the wireless terminal based on the destination possibility data included in the provided service information accepts the provided service information only if it is determined that there is the destination possibility.

24 Claims, 13 Drawing Sheets

FIG. 3

| SERVICE INFORMATION | DESTINATION INFORMATION |
|---|---|
| SERVICE INFORMATION A | WIRELESS TERMINAL 3a |
| SERVICE INFORMATION B | WIRELESS TERMINAL 3b |
| SERVICE INFORMATION C | WIRELESS TERMINAL 3c |
| SERVICE INFORMATION D | WIRELESS TERMINAL 3a AND WIRELESS TERMINAL 3b |
| ⋮ | ⋮ |

FIG. 4

| NAME OF WIRELESS TERMINALS | ADDRESSES | PRIVATE KEY |
|---|---|---|
| WIRELESS TERMINAL 3a | ADDRESS a | PRIVATE KEY a |
| WIRELESS TERMINAL 3b | ADDRESS b | PRIVATE KEY b |
| WIRELESS TERMINAL 3c | ADDRESS c | PRIVATE KEY c |

WIRELESS NETWORK SYSTEM, INFORMATION PROVIDING APPARATUS AND WIRELESS TERMINAL

BACKGROUND OF THE INVENTION

1. Field of the Invention

The present invention relates to an information providing apparatus that provides service information over a wireless network, a wireless terminal that receive service information provided from an information providing apparatus and a wireless network system.

2. Description of the Related Art

In recent years, services have made their appearance that provide various kinds of service information to users who use a wireless terminal. For example, at an installation, advertisement information may be provided to a wireless terminal used by a specific user who uses the installation. Another service makes its appearance that provides service information requested by a user through a wireless terminal. For example, in a case where a user requests general guidance information of an installation by using a wireless terminal, the general guidance information of the installation may be provided to the wireless terminal used by the user.

A factor responsible for the prevention of the use of the services may be a risk of the leak of information relating to a user who uses the wireless terminal. In a case where information is exchanged over a wireless network, a third party can listen in to the exchanged information easily. Therefore, information such as an address of the wireless terminal used by a user may leak easily. In a case where the wireless network is a multi-hop network that relays the information to be exchanged through one or more relays, information such as an address of the wireless terminal used by a user may leak through an illegal relay.

JP-Kohyo (translation of PCT) No. 2003-516035 (Patent Document 1) discloses a system that transmits information to a terminal with multiple identification names or indicators such as an address. The identification name or indicator indicating a terminal is described as a Bloom Filter created from the identification names or indicators. In this case, an identification name or indicator indicating a terminal, such as an address of the terminal, may not be obtained from the Bloom Filter describing an identification name or indicator indicating the terminal. Therefore, the leak of information such as an address of the terminal to a third party can be prevented.

SUMMARY OF THE INVENTION

In such a system, an identification name or indicator indicating a terminal, such as an address, is described as a Bloom Filter, and information is transmitted to a terminal having multiple identification names or indicators over a network. However, the system is not applicable to a wireless network system in which many users move about through wireless terminals. Applying such a system to the wireless network system requires updating the routing table describing transmission paths of information every time a wireless terminal therein moves. There is further a danger that an action of a user who uses a wireless terminal therein may be specified by continuously using one Bloom Filter created from an address, for example, by the wireless terminal.

The invention has been made from the viewpoint described above, and it is an object of the invention to provide a wireless network system, information providing apparatus and wireless terminal that can prevent the leak of information such as an address of a wireless terminal.

According to an aspect of the invention, there is provided a wireless network system including an information providing apparatus that provides service information over a wireless network, and multiple wireless terminals each of which receives the service information provided from the information providing apparatus, wherein the information providing apparatus includes destination possibility data in the service information, and each of the wireless terminals has a destination possibility determining part for determining the destination possibility that the destination of the provided service information is the wireless terminal based on the destination possibility data included in the provided service information, and an accepting part for accepting the provided service information only if the destination possibility determining part determines that there is the destination possibility.

According to another aspect of the invention, there is provided an information providing apparatus that provides service information over a wireless network, wherein destination possibility data is included in the service information.

According to another aspect of the invention, there is provided a wireless terminal that receives service information provided from an information providing apparatus, including a destination possibility determining part for determining the destination possibility that the destination of the provided service information is the wireless terminal based on destination possibility data included in the provided service information, and an accepting part for accepting the provided service information only if the destination possibility determining part determines there is the destination possibility.

BRIEF DESCRIPTION OF THE DRAWINGS

FIG. 3 is a diagram showing an example of a service information management table of the information providing apparatus in FIG. 2;

FIG. 4 is a diagram showing an example of a wireless terminal information management table of the information providing apparatus in FIG. 2;

DETAILED DESCRIPTION OF THE INVENTION

With reference to the drawings, embodiments of the invention will be described in detail below.

Figure 1:
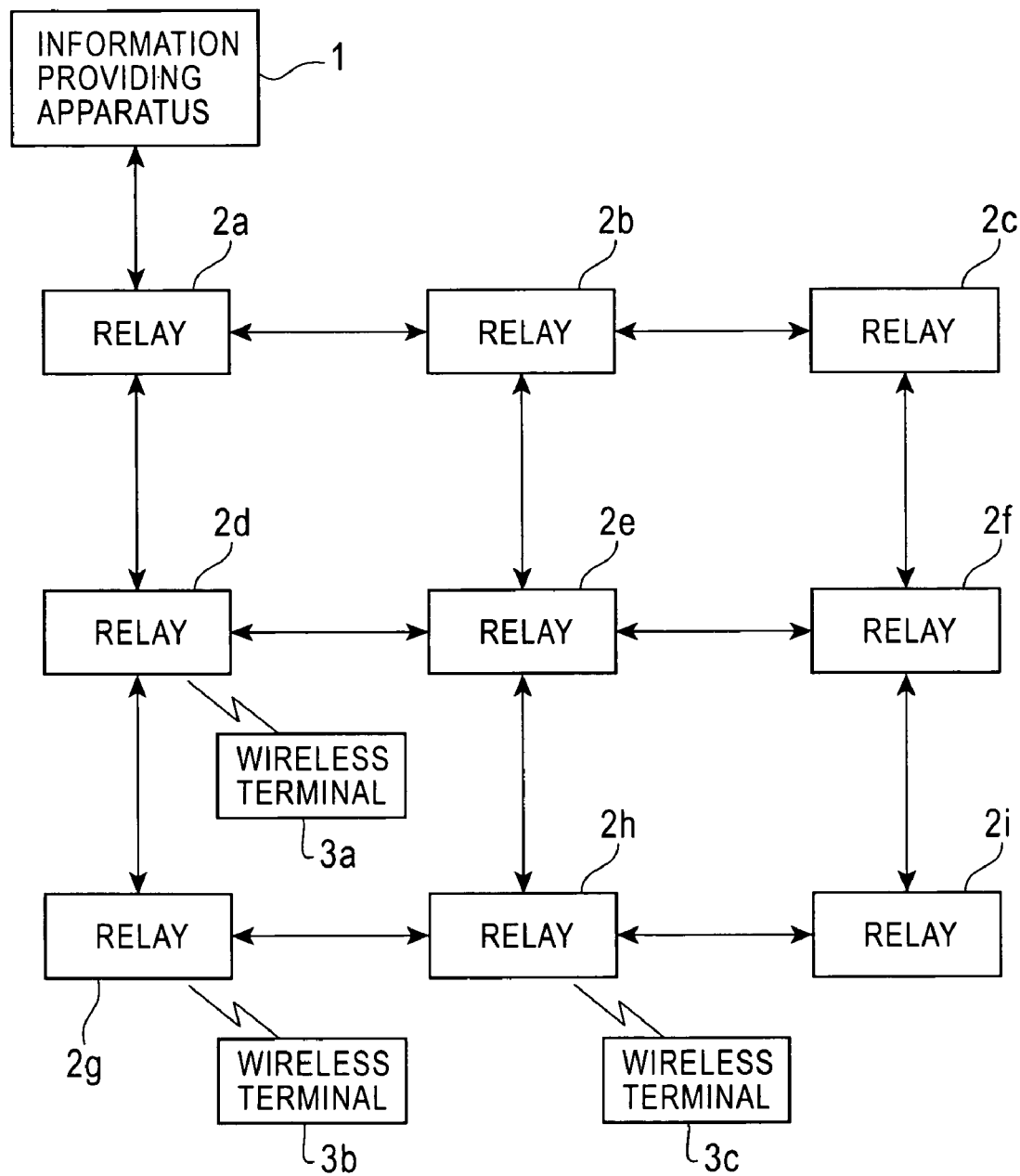
FIG. 1 is a block diagram showing a wireless network system according to a first embodiment of the invention.

FIG. 1 shows a first embodiment of the wireless network system according to the invention. The wireless network system includes an information providing apparatus 1 that provides service information, relays 2a to 2i that relay service information provided from the information providing apparatus 1, and wireless terminals 3a to 3c that receive service information. The data exchange between the information providing apparatus 1 and the relays 2a to 2i is performed over a wired LAN or wireless LAN. The relays 2a to 2i relay service information provided from the information providing apparatus 1 to the wireless terminals 3a to 3c over a wireless network. Each of the wireless terminals 3a to 3c receives service information provided from the information providing apparatus 1 over a wireless network.

Figure 2:
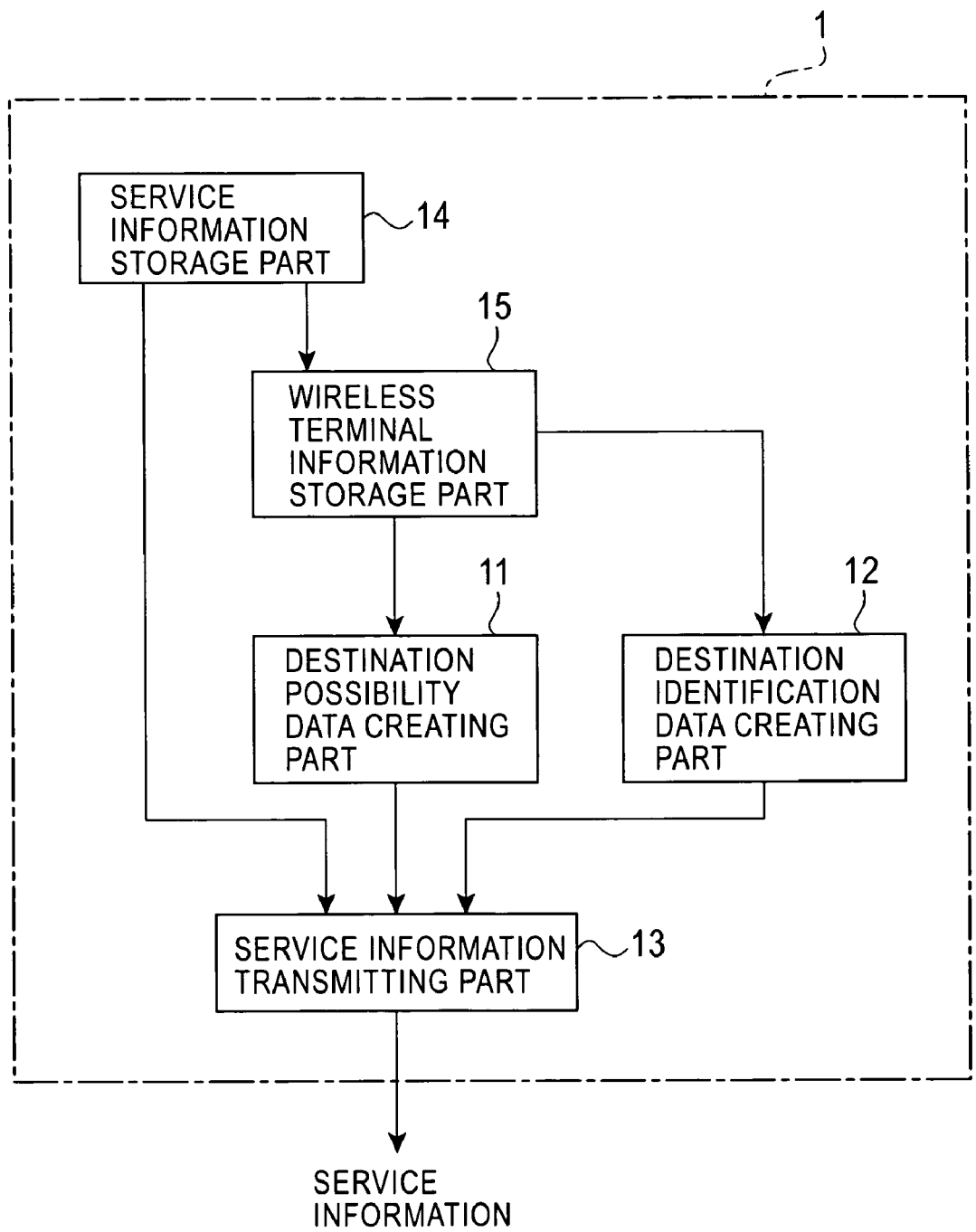
FIG. 2 is a block diagram showing an information providing apparatus of the wireless network system in FIG. 1.

FIG. 2 shows a configuration of the information providing apparatus 1. The information providing apparatus 1 provides service information over a wireless network. A destination possibility data creating part 11 creates destination possibility data corresponding to a wireless terminal, which is the destination of service information. The destination possibility data is used for determining whether a given wireless terminal has the possibility that the wireless terminal is the destination of service information or not. The destination possibility data may be a Bloom Filter obtained by performing the function transformation processing on the address of a wireless terminal, which is the destination of service information, for example. A destination identification data creating part 12 creates destination identification data for identifying each of the wireless terminals 3a to 3c. The destination identification data may be the address of a wireless terminal, which is encoded with a private key owned by the wireless terminal. A service information transmitting part 13 includes the destination possibility data and destination identification data corresponding to the wireless terminal, which is the destination of service information, in the service information to be provided to the wireless terminal and transmits the service information to a wireless network by broadcasting. A service information storage part 14 stores service information to be provided to each of the wireless terminals 3a to 3c and the destination of the service information as a service information management table. A wireless terminal information storage part 15 stores information on each of the wireless terminals 3a to 3c, which are destinations of service information, as a wireless terminal information management table. The information on each of the wireless terminals 3a to 3c may be the name of the wireless terminal, the address of the wireless terminal and/or a private key owned by the wireless terminal, for example.

FIG. 3 shows an example of the service information management table. The service information management table includes items of service information and destination information. Under the item of service information, service information to be provided is recorded. Under the item of destination information, the name representing a wireless terminal, which is the destination of service information, is recorded. Under the item of destination information, multiple names representing wireless terminals can be recorded.

FIG. 4 shows an example of the wireless terminal information management table. The wireless terminal information management table includes items of wireless terminal name, address and private key. Under the item of wireless terminal name, a name representing each of the wireless terminals 3a to 3c is recorded. Under the item of address, an address of each of the wireless terminals 3a to 3c is recorded. Under the item of private key, a private key owned by each of the wireless terminals 3a to 3c is recorded.

Figure 5:
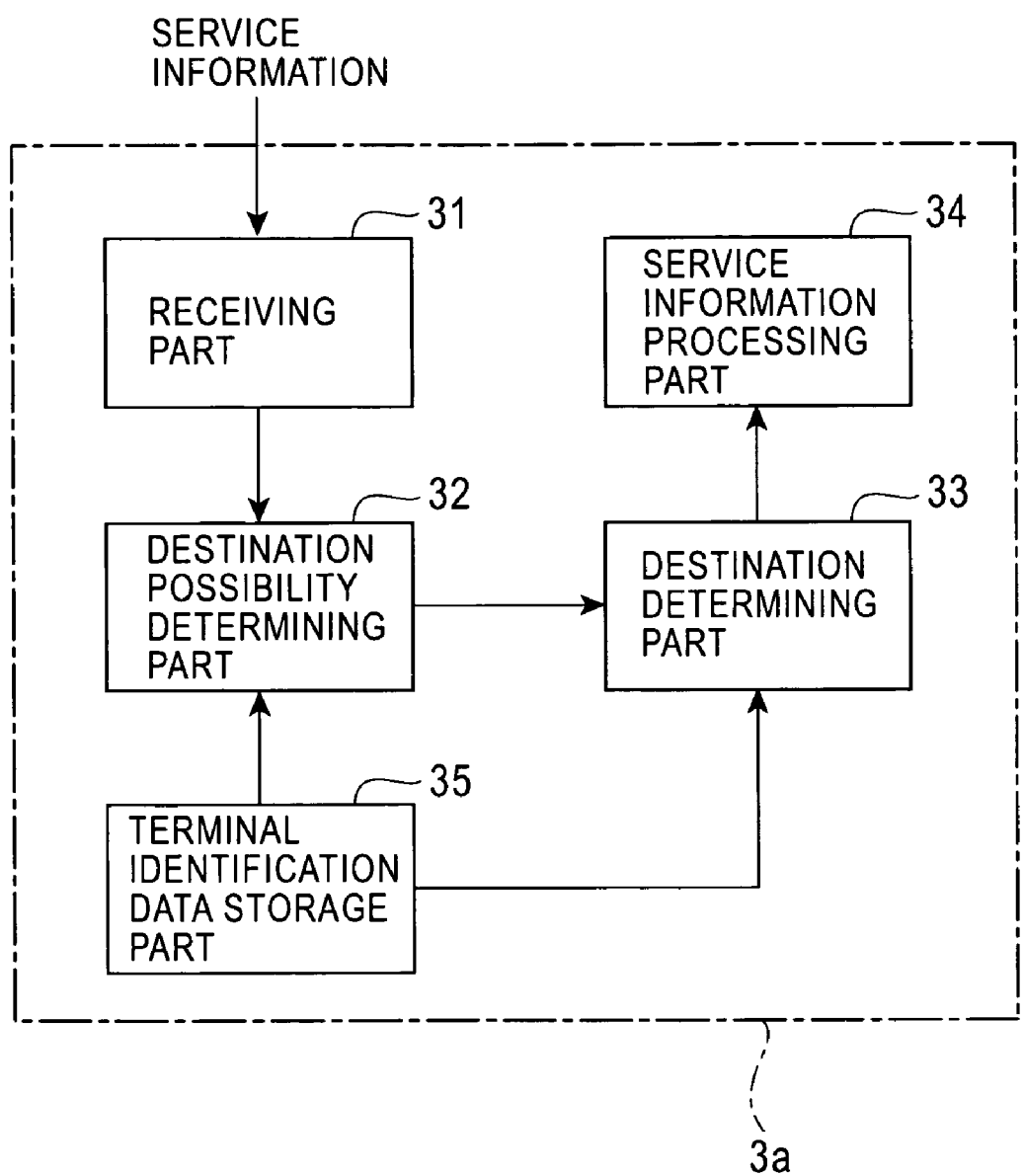
FIG. 5 is a block diagram showing the wireless terminal of the wireless network system in FIG. 1.

FIG. 5 shows a configuration of the wireless terminal 3a. The wireless terminal 3a receives service information provided from the information providing apparatus 1 over a wireless network. A receiving part 31 receives service information over a wireless network. A destination possibility determining part 32 determines the destination possibility that the wireless terminal 3a is the destination of the service information based on the destination possibility data included in the service information received by the receiving part 31. A destination determining part 33 determines whether the destination of service information is the wireless terminal 3a or not based on the destination identification data included in the service information determined by the destination possibility determining part 32 as that there is the destination possibility that the wireless terminal 3a may be the destination. A service information processing part 34 provides a display showing the service information determined by the destination determining part 33 as that the destination is the wireless terminal 3a. The destination determining part 33 and service information processing part 34 are included in accepting part. A terminal identification data storage part 35 stores information to be used for determining the destination of service information, such as an address or a private key of the wireless terminal 3a, for example. Each of the other wireless terminals 3b and 3c has the same configuration, not shown, as that of the wireless terminal 3a.

Figure 6:
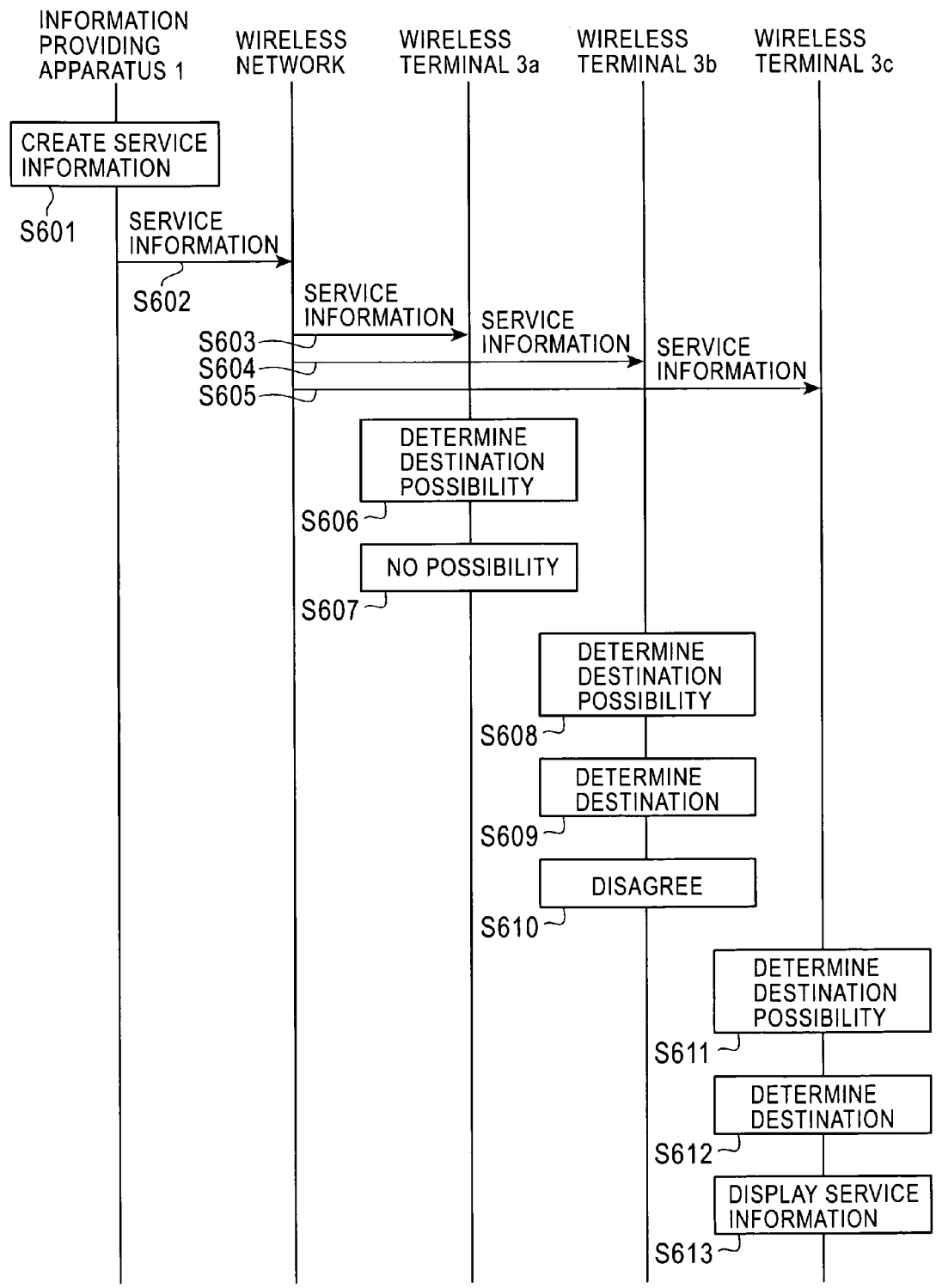
FIG. 6 is a sequence diagram showing an operation of the wireless network system in FIG. 1.

FIG. 6 shows an operation of the wireless network system in a case where service information is provided from the information providing apparatus 1 over a wireless network.

The information providing apparatus 1 loads "S", which is service information to be provided, from the service information storage part 14 and includes the loaded service information "S" in the destination possibility data and destination identification data (step S601). It is assumed here that the destination identification data is the address of a wireless terminal, which is encoded with a private key owned by the wireless terminal, which is the destination of service information. It is also assumed here that the destination possibility data is a Bloom Filter obtained by performing function transformation processing on the address of the wireless terminal, which is the destination of service information.

The Bloom Filter can be obtained by following steps. First of all, a bit array of m bits of all "0" is prepared (where m is a natural number). Next, the address of a wireless terminal is input to k independent hash functions in a value domain of [1,m] to calculate k hash values (where k is a natural number). Then, the bits of the bit array corresponding to the positions indicated by the hash values are set to "1". The bit array obtained by the steps above is handled as a Bloom Filter. If service information is destined to multiple wireless terminals, a hash value is calculated for the address of each of the wireless terminals, and the bits of the bit array corresponding to the positions indicating the hash values are set to "1".

After including the destination possibility data and destination identification data in service information, the information providing apparatus 1 transmits service information to a wireless network by broadcasting (step S602). It is assumed here that service information "S, 0010101, R" is transmitted where "0010101" is the destination possibility data included in the service information to be transmitted and "R" is the destination identification data.

After the service information is transmitted from the information providing apparatus 1 to the wireless network, each of the wireless terminals 3a to 3c receives the service information from the wireless network (steps S603 to S605).

After receiving the service information from the wireless network, the wireless terminal 3a determines the destination possibility that the destination of the service information is the wireless terminal 3a based on the destination possibility data included in the service information (step S606). The wireless terminal 3a inputs the address of the wireless terminal to the k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3a. If at least one of them has a value excluding the bit "1", it is determined that there is not the destination possibility that the destination of the service information is the wireless terminal 3a. Here, it is assumed that it is determined that there is not the destination possibility that the destination of the service information is the wireless terminal 3a (step S607). In this case, the wireless terminal 3a exits the processing of receiving service information.

After receiving the service information from the wireless network, the wireless terminal 3b determines the destination possibility that the destination of the service information is the wireless terminal 3b based on the destination possibility data included in the service information (step S608). The wireless terminal 3b inputs the address of the wireless terminal to k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3b. If at least one of them has a value excluding the bit "1", it is determined that there is not the destination possibility that the destination of the service information is the wireless terminal 3b. Here, it is assumed that it is determined that there is the destination possibility that the destination of the service information is the wireless terminal 3b. If it is determined that there is the destination possibility that the destination of the service information is the wireless terminal 3b, the wireless terminal 3b determines whether the destination of the service information is the wireless terminal 3b or not based on the destination identification data included in the service information (step S609). The wireless terminal 3b decodes the destination identification data included in the service information by using a private key b owned by the wireless terminal 3b. Then, whether the one resulting from the decoding of the destination identification data agrees with the address of the wireless terminal 3b or not is determined. If so, it is determined that the destination of the service information is the wireless terminal 3b. If not, it is determined that the destination of the service information is not the wireless terminal 3b. It is assumed here that it is determined that the destination of service information is not the wireless terminal 3b (step S610). In this case, the wireless terminal 3b exits the processing of receiving service information.

After receiving the service information from the wireless network, the wireless terminal 3c determines the destination possibility that the destination of the service information is the wireless terminal 3c based on the destination possibility data included in the service information (step S611). The wireless terminal 3c inputs the address of the wireless terminal to k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3c. If at least one of them has a value excluding the bit "1", it is determined that there is not the destination possibility that the destination of the service information is the wireless terminal 3c. Here, it is assumed that it is determined that there is the destination possibility that the destination of the service information is the wireless terminal 3c. If it is determined that there is the destination possibility that the destination of the service information is the wireless terminal 3c, the wireless terminal 3c determines whether the destination of the service information is the wireless terminal 3c or not based on the destination identification data included in the service information (step S612). The wireless terminal 3c decodes the destination identification data included in the service information by using a private key c owned by the wireless terminal 3c. Then, whether the one resulting from the decoding of the destination identification data agrees with the address of the wireless terminal 3c or not is determined. If so, it is determined that the destination of the service information is the wireless terminal 3c. If not, it is determined that the destination of the service information is not the wireless terminal 3c. It is assumed there that it is determined that the destination of service information is the wireless terminal 3c. If it is determined that the destination of the service information is the wireless terminal 3c, the wireless terminal 3c provides a display showing the received service information (step S613).

Figure 7:
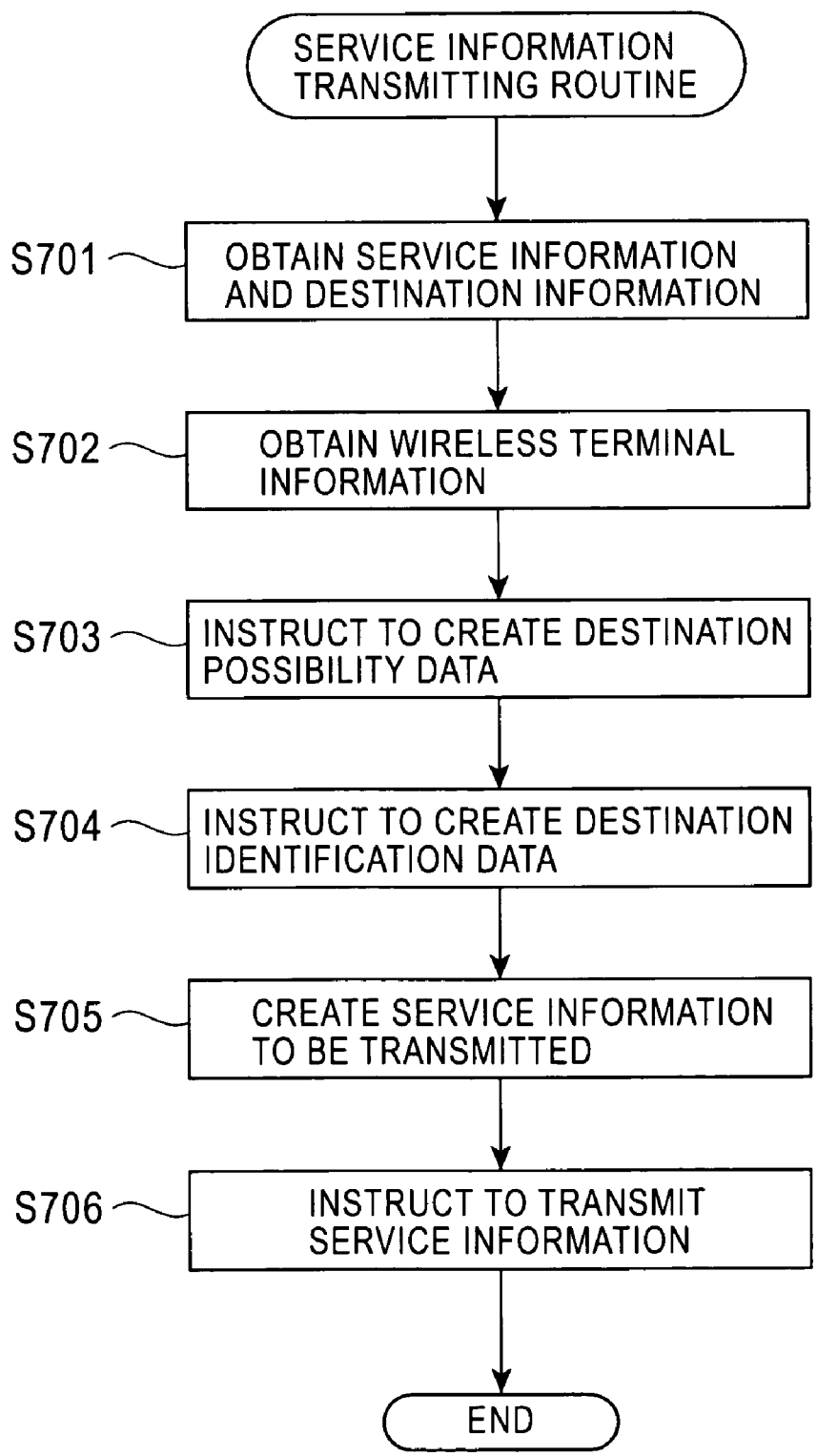
FIG. 7 is a flowchart showing operations of a service information transmitting routine by the information providing apparatus in FIG. 2.

FIG. 7 shows operations of a service information transmitting routine to be performed by a controller (not shown) of the information providing apparatus 1. The service information transmitting routine is performed at a time for transmitting service information, such as a predetermined time.

The controller obtains service information to be provided and the destination information corresponding to the service information from the service information storage part 14 (step S701). After obtaining the service information and destination information, the controller obtains wireless terminal information of the wireless terminal described by the obtained destination information, such as an address of the wireless terminal and a private key owned by the wireless terminal from the wireless terminal information storage part 15 (step S702). After obtaining the wireless terminal information, the controller instructs the destination possibility data creating part 11 to create the destination possibility data (step S703). The destination possibility data creating part 11 creates the destination possibility data in response to the instruction from the controller. The destination possibility data may be a Bloom Filter obtained by performing the function transformation processing on the address of the wireless terminal, which is the destination of the service information. After instructing the destination possibility data creating part 11, the controller instructs the destination identification data creating part 12 to create the destination identification data (step S704). The destination identification data creating part 12 creates the destination identification data in response to the instruction from the controller. The destination identification data may be one resulting from the encoding of the address of the wireless terminal with a private key owned by the wireless terminal. After instructing the destination identification data creating part 12, the controller includes the destination possibility data and destination identification data in the service information (step S705). Then, the controller instructs the service information transmitting part 13 to transmit the service information (step S706). The service information transmitting part 13 performs processing of transmitting the service information to the wireless network by broadcasting in response to the instruction from the controller.

Figure 8:
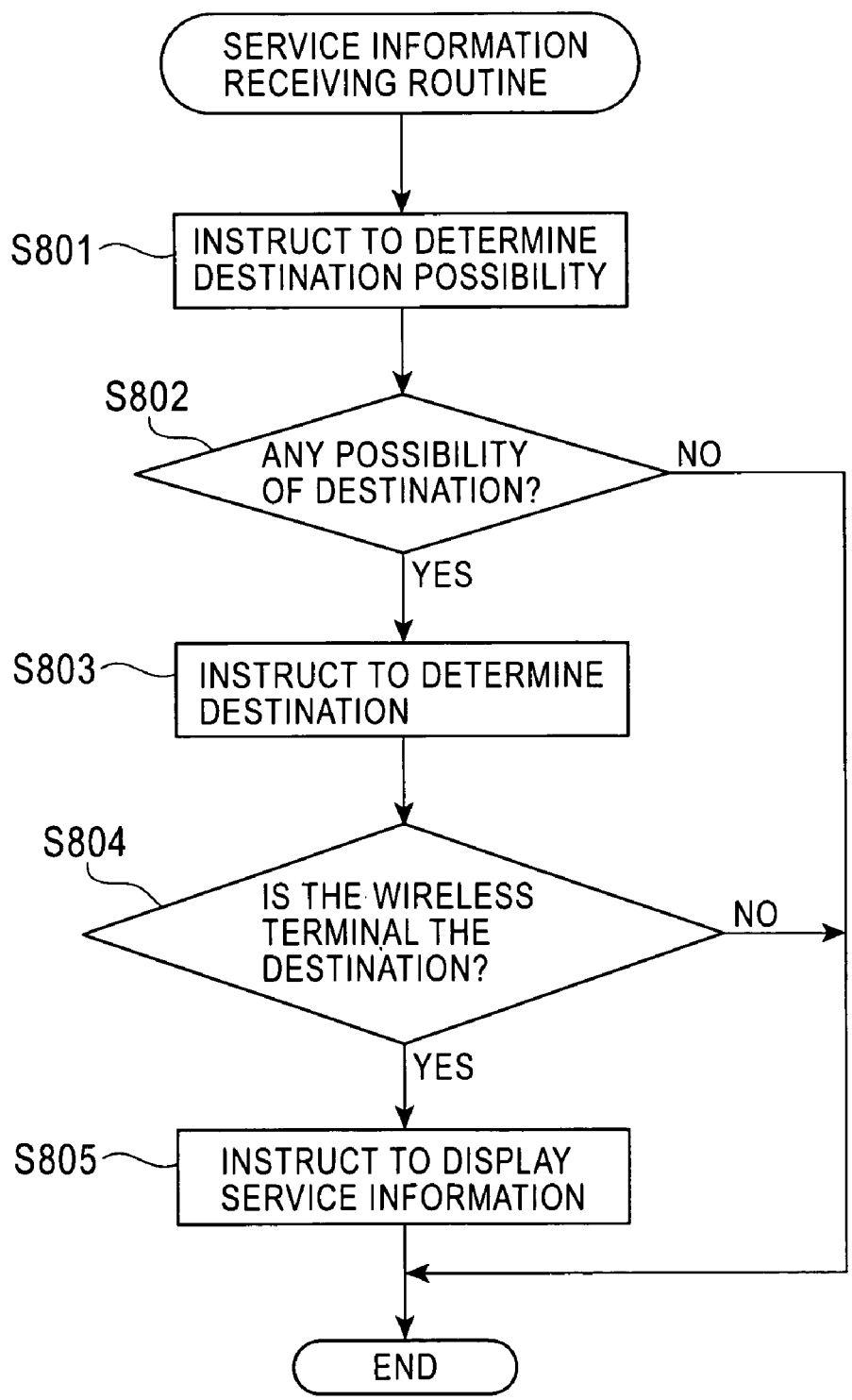
FIG. 8 is a flowchart showing operations of a service information receiving routine by a wireless terminal in FIG. 5.

FIG. 8 shows operations of a service information receiving routine to be performed by a controller (not shown) of the wireless terminal 3a. The service information receiving routine is performed when the service information provided from the information providing apparatus is received over a wireless network.

The controller instructs the destination possibility determining part 32 to determine the destination possibility that the destination of the service information received by the receiving part 31 is the wireless terminal 3a (step S801). The destination possibility determining part 32 determines the destination possibility that the destination of the service information is the wireless terminal 3a based on the destination possibility data included in the service information in response to the instruction from the controller.

After instructing the destination possibility determining part 32, the controller checks the determination result by the destination possibility determining part 32 (step S802). If the destination possibility determining part 32 determines that there is not the destination possibility that the destination of the service information is the wireless terminal 3a, the controller exits the processing. If the destination possibility determining part 32 determines that there is the destination possibility that the destination of the service information is the wireless terminal 3a, the controller instructs the destination determining part 33 to determine whether the destination of the service information is the wireless terminal 3a or not (step S803). The destination determining part 33 in response to the instruction from the controller determines whether the destination of the service information is the wireless terminal 3a or not based on the destination identification data included in the service information.

After instructing the destination determining part 33, the controller checks the determination result by the destination determining part 33 (step S804). If the destination determining part 33 determines that the destination of the service information is not the wireless terminal 3a, the controller exits the processing. If the destination determining part 33 determines that the destination of the service information is the wireless terminal 3a, the controller instructs the service information processing part 34 to provide a display showing the received service information (step S805). The service information processing part 34 provides a display showing the received service information in response to the instruction from the controller.

In this way, in the wireless network system of the first embodiment, the information providing apparatus 1 includes the destination possibility data in service information and transmits the service information to a wireless network by broadcasting. The wireless terminal determines the destination possibility that the destination of the received service information is the wireless terminal based on the destination possibility data included in the received service information. A Bloom Filter obtained by performing the function transformation processing on an address of the wireless terminal is used for the creation of the destination possibility data. A Bloom Filter is characterized in that the address of a wireless terminal cannot be specified from the value of the Bloom Filter itself. Therefore, it is difficult to specify the wireless terminal, which is the destination, from service information. Since broadcasting is used for the transmission to a wireless network, the routing table describing the transmission paths of information is not required to update even though the wireless terminal moves. A wireless terminal determines the destination possibility that the destination is the wireless terminal before determining whether the destination of the received service information is the wireless terminal or not.

The destination possibility that the destination of the received service information is the wireless terminal is determined by filtering processing on the Bloom Filter used as the destination possibility data. For this reason, the processing can be more light-weighted than that in a case where the addresses of wireless terminals, which are the destination of service information, are all set to destination addresses, and each of the wireless terminals checks whether the destination is the wireless terminal or not.

Notably, while the destination possibility data here is a Bloom Filter obtained by performing the function transformation processing on an address of a wireless terminal, which is the destination of service information, the destination possibility data is not limited thereto. While the destination identification data here is one resulting from the encoding of an address of a wireless terminal with a private key owned by the wireless terminal, the destination identification data may be one resulting from the encoding of service information with a private key or one resulting from the encoding of the destination possibility data with a private key, for example. While a private key owned by a wireless terminal is used for the encoding when the destination identification data is created, the encoding may be performed with a public key corresponding to the private key owned by the wireless terminal or information secretly owned by the wireless terminal, for example. Having described here the example in which the information providing apparatus 1 transmits service information to a wireless network by broadcasting, the invention is not limited thereto. The information providing apparatus 1 may transmit service information to a relay or relays by unicasting or multicasting and distribute service information received by the relay or relays.

A second embodiment of the invention will be described below.

FIG. 1 shows a second embodiment of the wireless network system according to the invention, like the first embodiment. The wireless network system includes an information providing apparatus 1 that provides service information, relays 2a to 2i that relay service information provided from the information providing apparatus 1, and wireless terminals 3a to 3c that receive service information. The data exchange between the information providing apparatus 1 and the relays 2a to 2i is performed over a wired LAN or wireless LAN. The relays 2a to 2i relay service information provided from the information providing apparatus 1 to the wireless terminals 3a to 3c over a wireless network. Over a wireless network, each of the wireless terminals 3a to 3c transmits request information representing requested service information to the information providing apparatus 1 and receives service information provided from the information providing apparatus 1.

Figure 9:
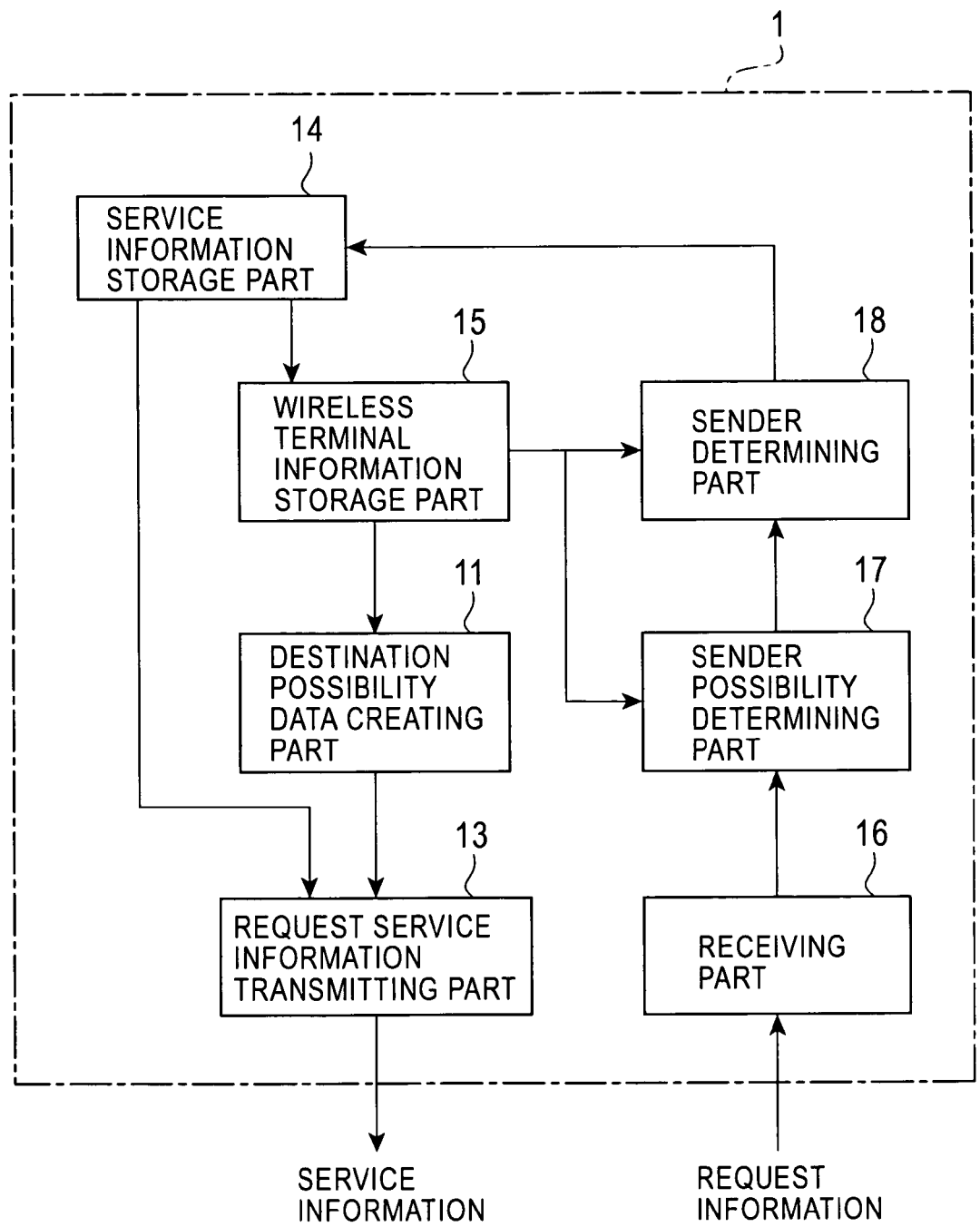
FIG. 9 is a block diagram showing an information providing apparatus of a wireless network system according to a second embodiment of the invention.

FIG. 9 shows a configuration of the information providing apparatus 1. The information providing apparatus 1 provides service information requested by the request information over a wireless network. Destination possibility data creating part 11 creates destination possibility data corresponding to a wireless terminal, which is a destination of service information. The destination possibility data is used for determining whether a given wireless terminal has the possibility that the wireless terminal is the destination of service information or not. The destination possibility data may be a Bloom Filter obtained by performing the function transformation processing on the address of a wireless terminal, which is the destination of service information, for example. Service information transmitting part 13 includes the destination possibility data corresponding to the wireless terminal, which is the destination of the service information, and the request information received from the wireless terminal in the service information to be provided to the wireless terminal and transmits the service information to the wireless network by broadcasting. Service information storage part 14 stores service information to be provided to each of the wireless terminals 3a to 3c. Wireless terminal information storage part 15 stores information on each of the wireless terminals 3a to 3c, which are destinations of service information. The information on each of the wireless terminals 3a to 3c may be the name of the wireless terminal, the address of the wireless terminal and/or a private key owned by the wireless terminal. Receiving part 16 receives request information to be transmitted to each of the wireless terminals 3a to 3c over a wireless network. Sender possibility determining part 17 determines whether there is the possibility that each of the wireless terminals 3a to 3c is a sender of request information or not based on sender possibility data included in request information. Sender determining part 18 determines whether the wireless terminal determined as having the possibility of the sender of the request information by the sender possibility determining part 17 is the sender of the request information or not based on terminal identification data included in the request information.

Figure 10:
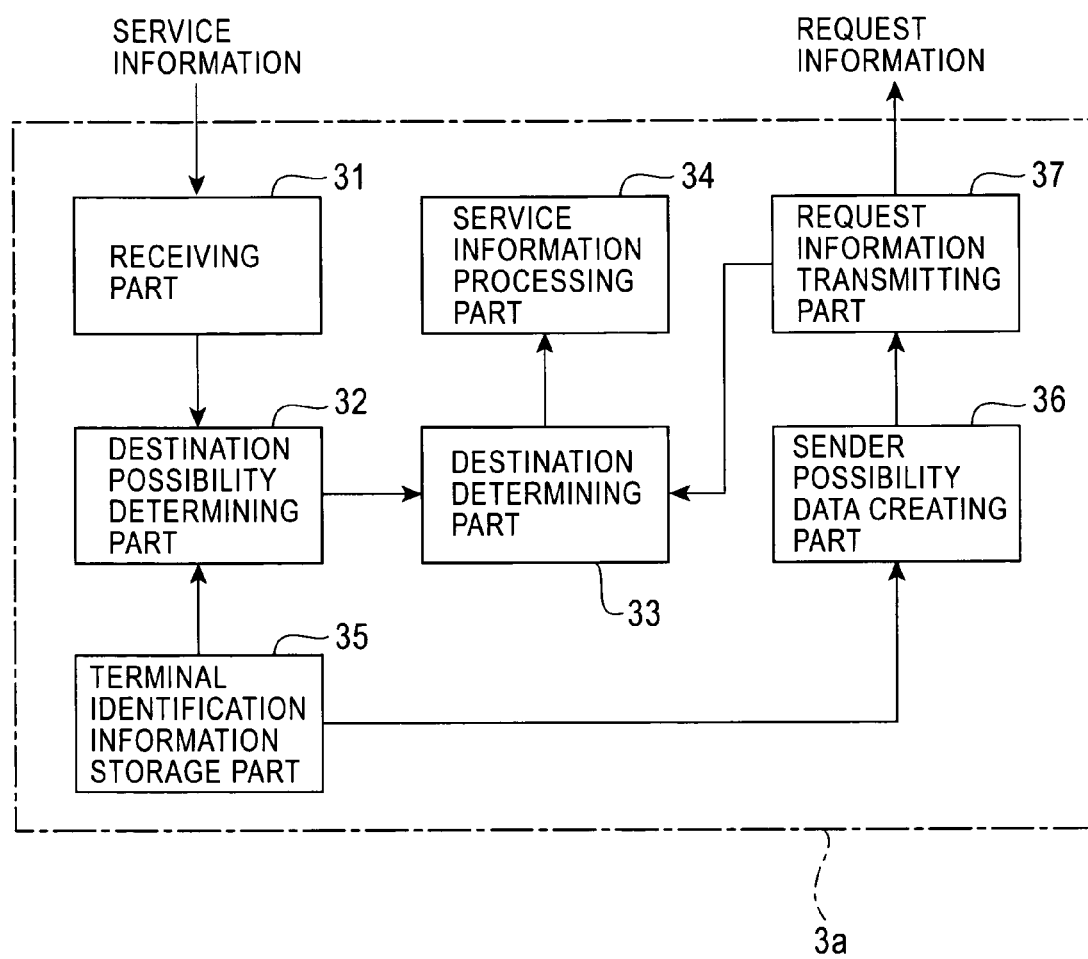
FIG. 10 is a block diagram showing a wireless terminal of the wireless network system according to the second embodiment of the invention.

FIG. 10 shows a configuration of the wireless terminal 3a. The wireless terminal 3a transmits request information representing requested service information to the information providing apparatus 1 over a wireless network. The wireless terminal 3a receives service information provided from the information providing apparatus 1 over a wireless network. Receiving part 31 receives service information over a wireless network. Destination possibility determining part 32 determines the destination possibility that the destination of the service information is the wireless terminal 3a based on destination possibility data included in the service information received by the receiving part 31. Destination determining part 33 determines whether the destination of service information, which is determined by the destination possibility determining part 32 as having the destination possibility that the wireless terminal 3a is the sender, is the wireless terminal 3a or not. The service information processing part 34 provides a display showing the service information determined by the destination determining part 33 as that the destination is the wireless terminal 3a. The destination determining part 33 and service information processing part 34 are included in accepting part. Terminal identification data storage part 35 may store an address or a private key of the wireless terminal 3a, for example. Sender possibility data creating part 36 creates sender possibility data corresponding to the wireless terminal 3a. Sender possibility data is used for determining a wireless terminal having the possibility of the sender of request information. The sender possibility data may be a Bloom Filter obtained by performing the function transformation processing on an address of the wireless terminal 3a, for example. Request information transmitting part 37 includes sender possibility data and terminal identification data representing the wireless terminal 3a, for example, in request information and transmits the request information to the information providing apparatus 1 over a wireless network. Each of the other wireless terminals 3b to 3c has the same configuration, not shown, as that of the wireless terminal 3a.

Figure 11:
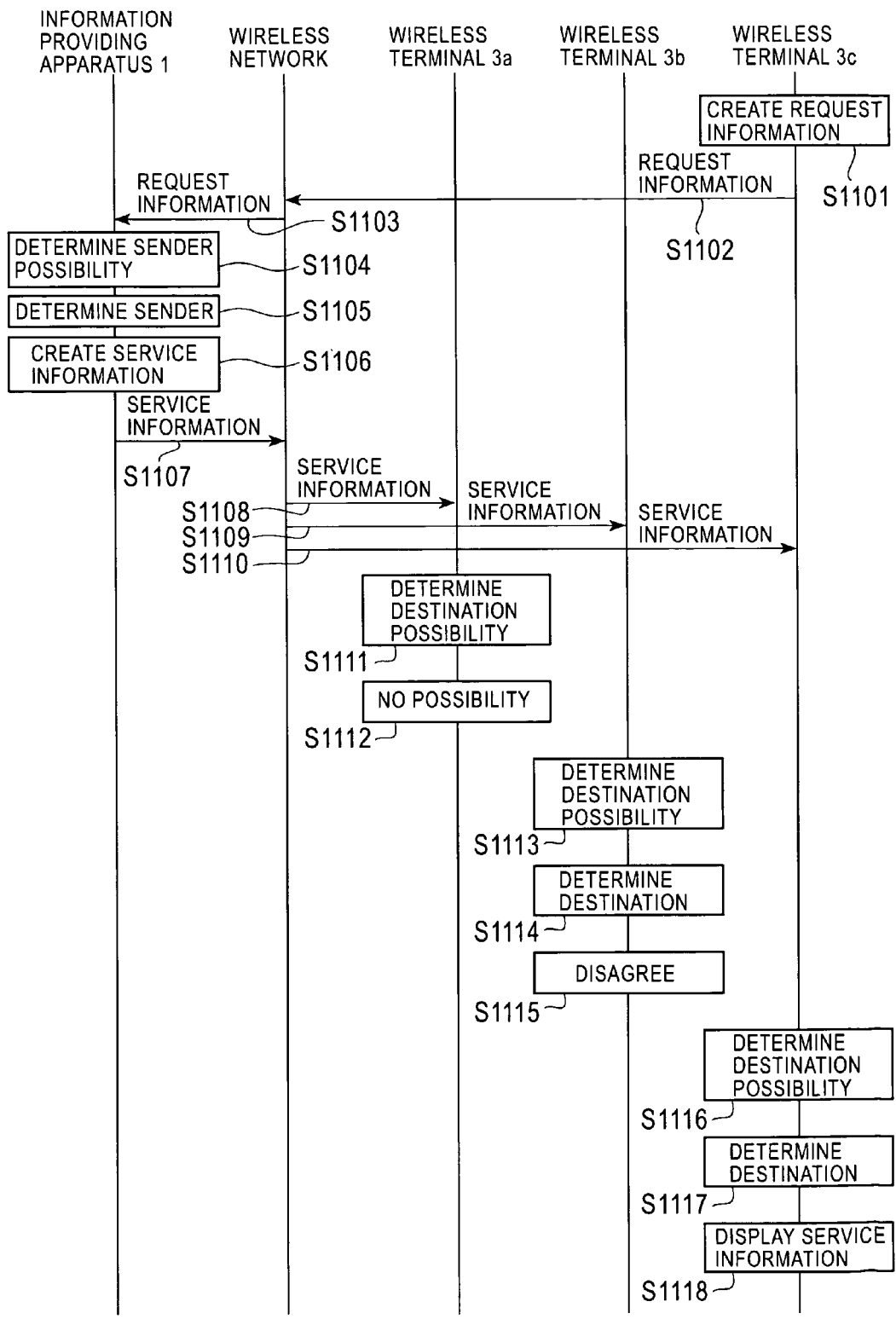
FIG. 11 is a sequence diagram showing an operation of the wireless network system according to the second embodiment of the invention.

FIG. 11 shows an operation of the wireless network system in a case where request information is transmitted from the wireless terminal 3c over a wireless network.

The wireless terminal 3c includes sender possibility data and terminal identification data in request information "R" (step S1101). The terminal identification data may be one resulting from the encoding of the request information "R" with a private key owned by the wireless terminal 3c. Here, the terminal identification data may be one resulting from the encoding of the request information "R" with a private key owned by the wireless terminal 3c. It is assumed here that a Bloom Filter obtained by performing the function transformation processing on an address of the wireless terminal 3c is used as the sender possibility data.

The Bloom Filter can be obtained by following steps. First of all, a bit array of m bits of all "0" is prepared (where m is a natural number). Next, the address of the wireless terminal 3c is input to k independent hash functions in a value domain of [1,m] to calculate k hash values (where k is a natural number). Then, the bits of the bit array corresponding to the positions indicated by the hash values are set to "1". In the bit array obtained by the steps above, an arbitrary bit is selected, and the selected bit is set to "1". Here, the bit to be set to "1" may be selected differently every time. In this way, a Bloom Filter is obtained.

After including the sender possibility data and terminal identification data in request information, the wireless terminal 3c transmits the request information to the information providing apparatus 1 over the wireless network (step S1102). It is assumed here that request information "R, 1110101, E" is transmitted where "1110101" is the sender possibility data included in the request information to be transmitted and "E" is the terminal identification data.

After receiving the request information from the wireless network (step S1103), the information providing apparatus 1 determines whether each of the wireless terminals 3a to 3c has the possibility of the sender of the request information based on the sender possibility data included in the request information (step S1104). The information providing apparatus 1 inputs the address of the wireless terminal to k independent hash functions and calculates k hash values. Then, whether the values of the bits of the sender possibility data corresponding to the positions indicated by the hash values are all "1" or not is checked. If all of them are "1", it is determined that there is the possibility that the wireless terminal is the sender of the request information. If at least one of them has a value excluding the bit "1", it is determined that there is not the possibility that the wireless terminal is the sender of the request information.

Then, the information providing apparatus 1 determines whether the wireless terminal determined as having the possibility of the sender of request information is the sender of the request information based on the terminal identification data included in the request information (step S1105). The information providing apparatus 1 decodes the terminal identification data by using a private key of the wireless terminal determined as having the possibility of the sender of the request information and checks whether it agrees with the request information or not. If so, the information providing apparatus 1 determines that the wireless terminal determined as having the possibility of the sender of the request information is the sender of the request information. If not, the wireless providing apparatus 1 determines that the wireless terminal determined as having the possibility of the sender of the request information is not the sender of the request information. It is assumed here that the wireless terminal 3c is determined as the sender of the request information.

After determining the sender of the request information, the information providing apparatus 1 loads "S", which is service information requested by the request information, from the service information storage part 14 and includes the loaded service information "S" in the destination possibility data and request information (step S1106). It is assumed here that the destination possibility data is a Bloom Filter obtained by performing function transformation processing on an address of the wireless terminal, which is the destination of service information.

The Bloom Filter can be obtained by following steps. First of all, a bit array of m bits of all "0" is prepared (where m is a natural number). Next, the address of a wireless terminal is input to k independent hash functions in a value domain of [1,m] to calculate k hash values (where k is a natural number). Then, the bits of the bit array corresponding to the positions indicated by the hash values are set to "1". The bit array obtained by the steps above is handled as a Bloom Filter.

After including the destination possibility data and request information in the service information, the information providing apparatus 1 transmits service information to the wireless network by broadcasting (step S1107). It is assumed here that service information "S, 0010101, R" is transmitted where "0010101" is the destination possibility data included in the service information to be transmitted and "R" is the request information.

After the service information is transmitted from the information providing apparatus 1 to the wireless network, each of the wireless terminals 3a to 3c receives the service information from the wireless network (steps S1108 to S1110).

After receiving the service information from the wireless network, the wireless terminal 3a determines the destination possibility that the destination of the service information is the wireless terminal 3a based on the destination possibility data included in the service information (step S1111). The wireless terminal 3a inputs the address of the wireless terminal to k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3a. If at least one of them has a value excluding the bit "1", it is determined that there is not the destination possibility that the destination of the service information is the wireless terminal 3a. Here, it is assumed that it is determined that there is not the destination possibility that the destination of the service information is the wireless terminal 3a (step S1112). In this case, the wireless terminal 3a exits the processing of receiving service information.

After receiving the service information from the wireless network, the wireless terminal 3b determines the destination possibility that the destination of the service information is the wireless terminal 3b based on the destination possibility data included in the service information (step S1113). The wireless terminal 3b inputs the address of the wireless terminal to k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3b. If at least one of them has a value excluding the bit "1", it is determined that there is not the destination possibility that the destination of the service information is the wireless terminal 3b. Here, it is assumed that it is determined that there is the destination possibility that the destination of the service information is the wireless terminal 3b. If it is determined that there is the destination possibility that the destination of the service information is the wireless terminal 3b, the wireless terminal 3b determines whether the destination of the service information is the wireless terminal 3b or not (step S1114). The wireless terminal 3b checks whether the request information included in the service information agrees with the request information transmitted to the information providing apparatus 1 or not. If so, it is determined that the destination of the service information is the wireless terminal 3b. If not, it is determined that the destination of the service information is not the wireless terminal 3b. It is assumed here that it is determined that the destination of service information is not the wireless terminal 3b (step S1115). In this case, the wireless terminal 3b exits the processing of receiving service information.

After receiving the service information from the wireless network, the wireless terminal 3c determines the destination possibility that the destination of the service information is the wireless terminal 3c based on the destination possibility data included in the service information (step S1116). The wireless terminal 3c inputs the address of the wireless terminal to k independent hash functions and calculates k hash values. Then, whether the values of the bits of the destination possibility data corresponding to the positions indicated by the hash values are all "1" or not is checked. If all of them are "1", it is determined that there is the destination possibility that the destination of the service information is the wireless terminal 3c. If at least one of them has a value excluding the bit "1", it is determined that there is not the destination possibility that the destination of the service information is the wireless terminal 3c. Here, it is assumed that it is determined that there is the destination possibility that the destination of the service information is the wireless terminal 3c. If it is determined that there is the destination possibility that the destination of the service information is the wireless terminal 3c, the wireless terminal 3c determines whether the destination of the service information is the wireless terminal 3c or not (step S1117). The wireless terminal 3c checks whether the request information included in the service information agrees with the request information transmitted to the information providing apparatus 1 or not. If so, it is determined that the destination of the service information is the wireless terminal 3c. If not, it is determined that the destination of the service information is not the wireless terminal 3c. It is assumed here that it is determined that the destination of service information is the wireless terminal 3c. If it is determined that the destination of the service information is the wireless terminal 3c, the wireless terminal 3c provides a display showing the received service information (step S1118).

Notably, the destination possibility data to be included in service information requested by request information in transmitting the service information may be sender possibility data to be included in received request information. This eliminates the necessity for the processing of determining whether each of the wireless terminals 3a to 3c has the possibility of the sender of request information and the processing of determining the sender of request information.

Figure 12:
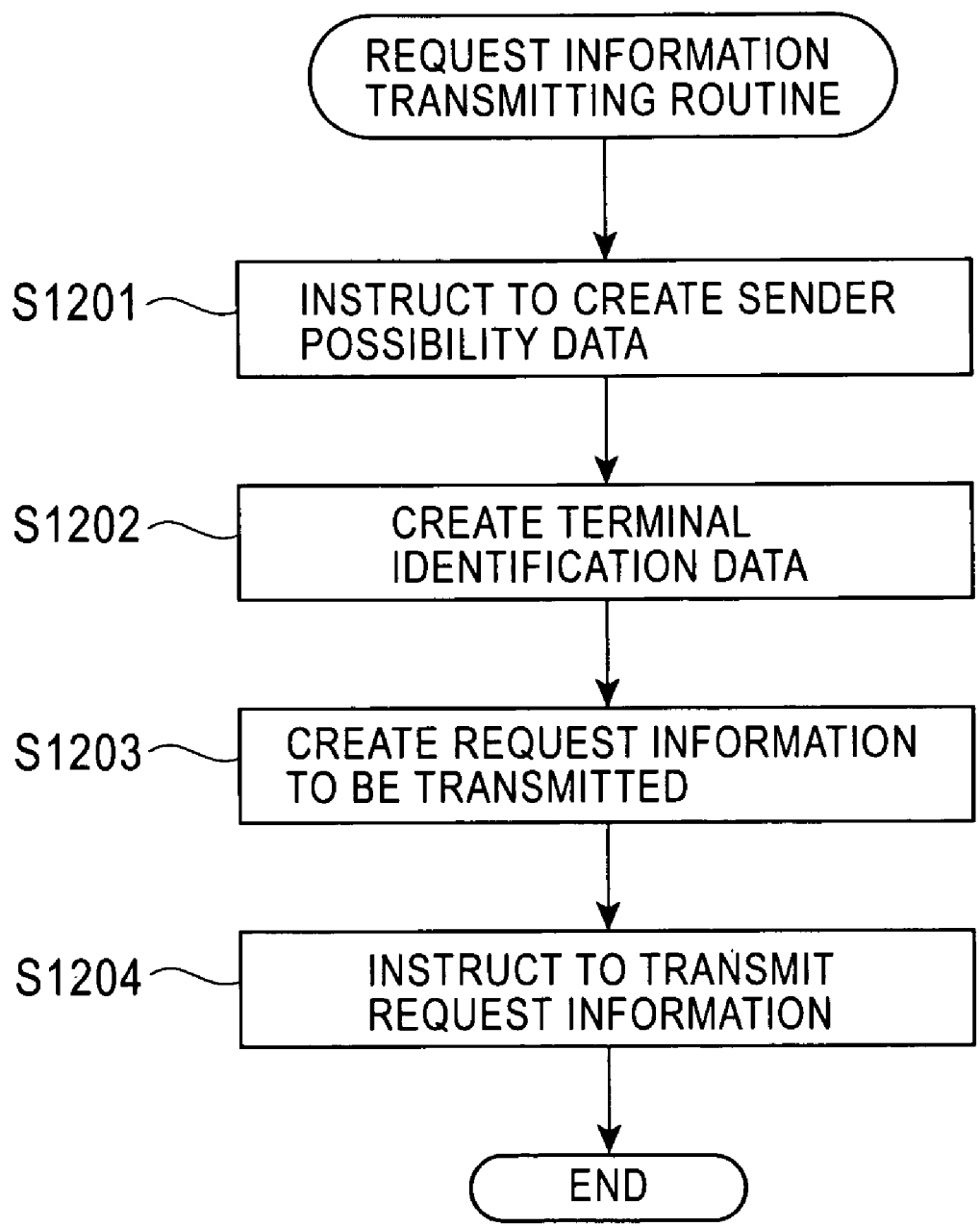
FIG. 12 is a flowchart showing operations of a request information transmitting routine by the wireless terminal in FIG. 10.

FIG. 12 shows operations of a request information transmitting routine to be performed by a controller (not shown) of the wireless terminal 3a. The request information transmitting routine is performed when an operation of transmitting request information is performed by an operator of the wireless terminal 3a.

The controller instructs sender possibility data creating part 36 to create sender possibility data (step S1201). The sender possibility data creating part 36 creates sender possibility data in response to the instruction from the controller. The sender possibility data may be a Bloom Filter obtained by performing function transformation processing on an address of the wireless terminal 3a, for example. After instructing the sender possibility data creating part 36, the controller creates terminal identification data (step S1202). The terminal identification data may be one resulting from the encoding of the request information representing the requested service information with a private key owned by the wireless terminal 3a. After creating the terminal identification data, the controller includes the sender possibility data and terminal identification data in the request information representing the requested service information (step S1203). Then, the controller instructs request information transmitting part 37 to transmit the request information (step S1204). The request information transmitting part 37 transmits the request information to the wireless network in response to the instruction from the controller.

Figure 13:
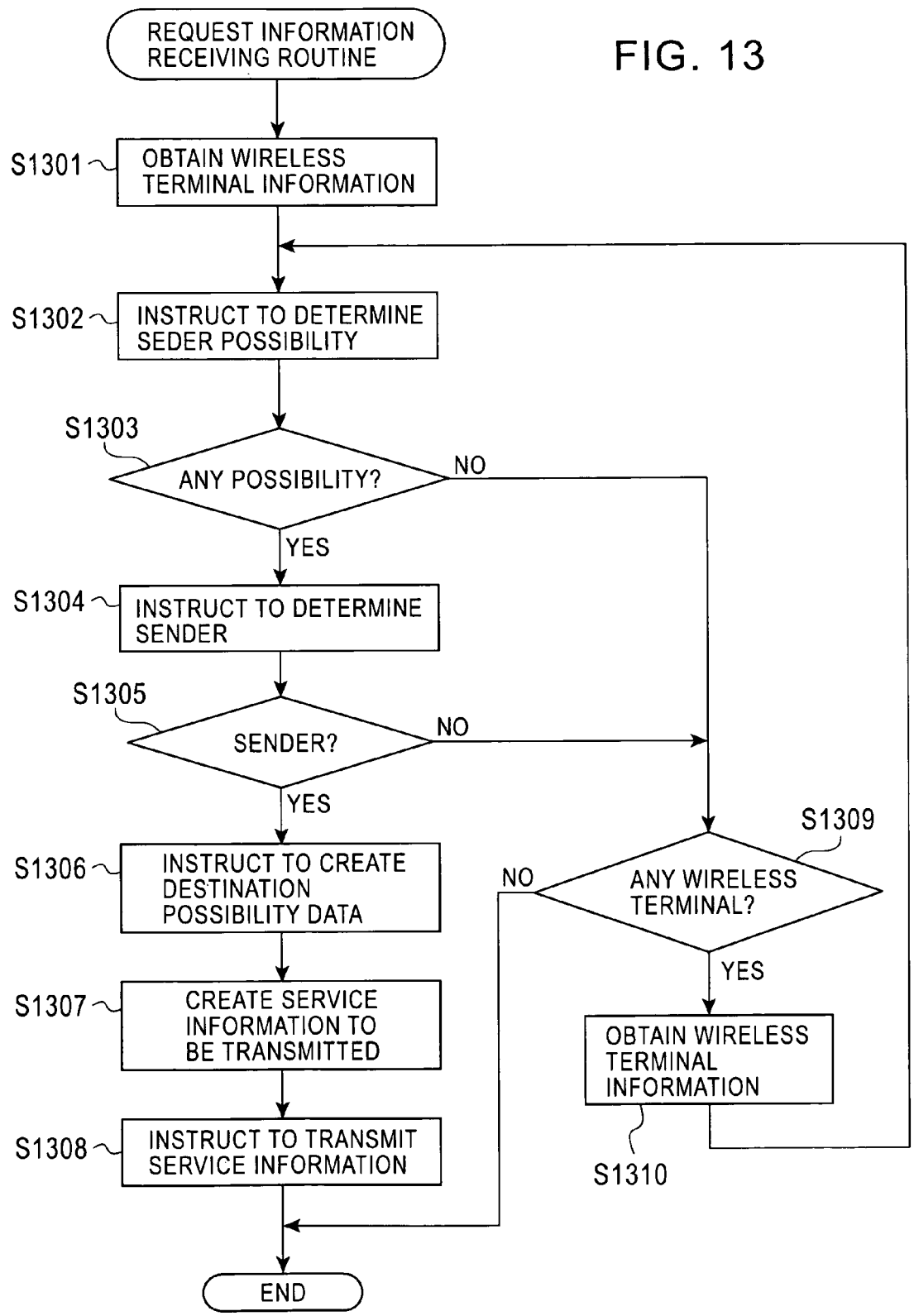
FIG. 13 is a flowchart showing operations of a request information receiving routine by the information providing apparatus in FIG. 9.

FIG. 13 shows operations of a request information receiving routine to be performed by a controller (not shown) of the information providing apparatus 1. The request information receiving routine is performed after receiving the request information over a wireless network.

The controller obtains information on a wireless terminal from the wireless terminal information storage part 15, such as an address of the wireless terminal and a private key owned by the wireless terminal, for example (step S1301). After obtaining the information on the wireless terminal, the controller instructs the sender possibility determining part 17 to determine whether the wireless terminal has the possibility of the sender of request information or not (step S1302). The sender possibility determining part 17 in response to the instruction from the controller determines whether the wireless terminal has the possibility of the sender of the request information based on the sender possibility data included in the request information.

After instructing the sender possibility determining part 17, the controller checks the determination result by the sender possibility determining part 17 (step S1303). If the sender possibility determining part 17 determines that there is the possibility of the sender of the request information, the controller instructs the sender determining part 18 to determine whether the wireless terminal determined as having the possibility of the sender of the request information by the sender possibility determining part 17 is the sender of the request information or not (step S1304). The sender determining part 18 in response to the instruction from the controller determines whether the wireless terminal is the sender of request information or not based on the terminal identification data included in the request information.

After instructing the sender determining part 18, the controller checks the determination result by the sender determining part 18 (step S1305). If the sender determining part 18 determines as the sender of the request information, the controller instructs the destination @possibility data creating part 11 to create the destination possibility data corresponding to the wireless terminal determined as the sender of the request information by the sender determining part 18 (step S1306). The destination possibility data creating part 11 creates the destination possibility data in response to the instruction from the controller. The destination possibility data may be a Bloom Filter obtained by performing the function transformation processing on the address of the wireless terminal determined as the sender of the request information, for example. After instructing the destination possibility data creating part 11, the controller obtains the service information requested by the request information from the service information storage part 14 and includes the destination possibility data and request information in the obtained service information (step S1307). Then, the controller instructs the service information transmitting part 13 to transmit the service information (step S1308). The service information transmitting part 13 performs processing of transmitting the service information to the wireless network by broadcasting in response to the instruction from the controller.

On the other hand, if the processing in step S1303 determines that there is not the possibility that the wireless terminal is not the sender of the request information and if the processing in step S1305 determines that the wireless terminal is not the sender of the request information, the controller checks whether any wireless terminal exists that has not been determined whether there is the possibility of the sender of the request information (step S1309). If so, the information on the wireless terminal is obtained from the wireless terminal information storage part 15 (step S1310), the processing from step S1302 is performed. If no wireless terminals exist that have not determined whether there is the possibility of the sender of the request information, the controller exits the processing.

Figure 14:
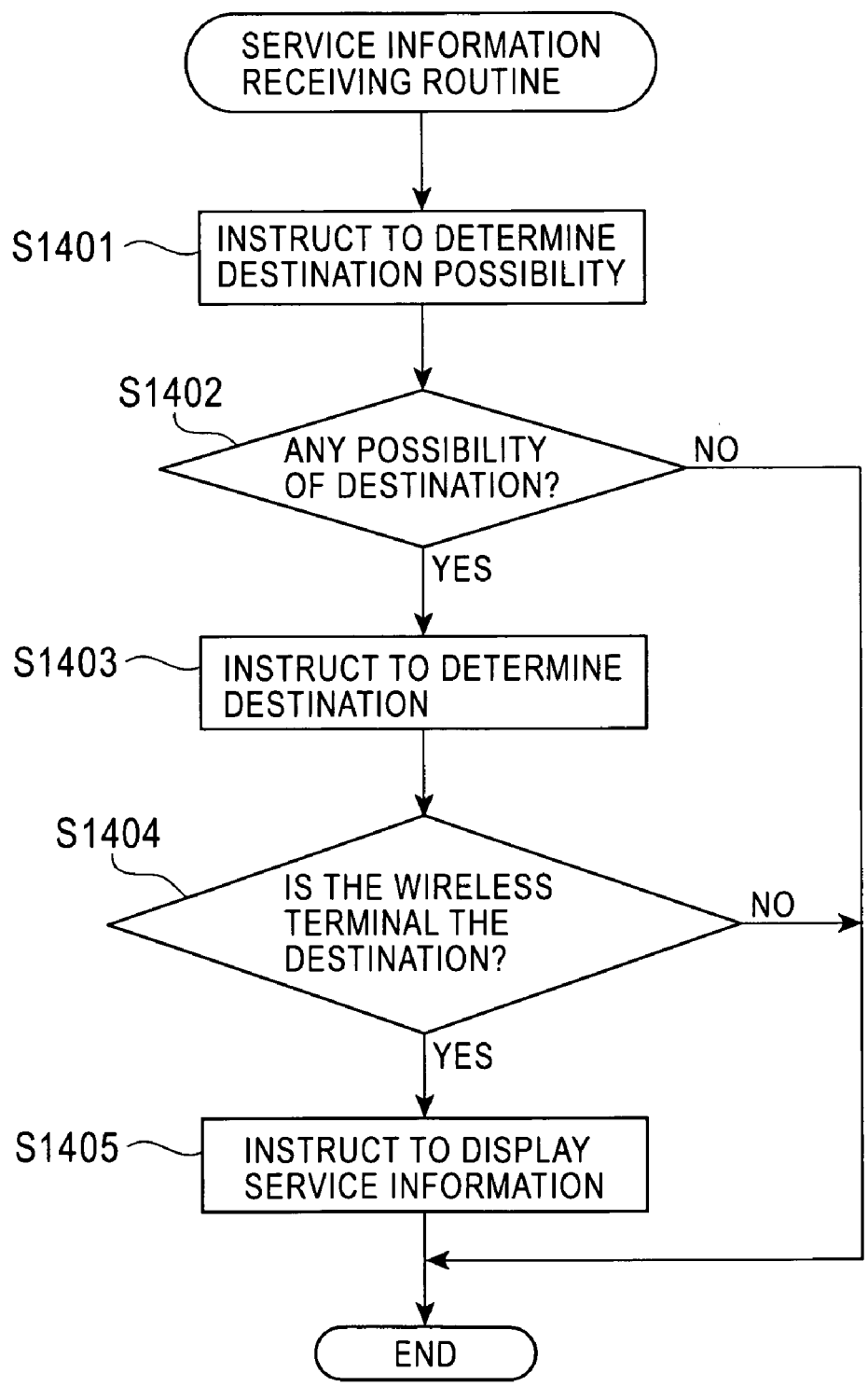
FIG. 14 is a flowchart showing operations of a service information receiving routine by the wireless terminal in FIG. 10.

FIG. 14 shows operations of a service information receiving routine to be performed by a controller (not shown) of the wireless terminal 3a. The service information receiving routine is performed when service information provided from the information providing apparatus is received over a wireless network.

The controller instructs the destination possibility determining part 32 to determine the destination possibility that the destination of the service information received by the receiving part 31 is the wireless terminal 3a (step S1401). The destination possibility determining part 32 determines the destination possibility that the destination of the service information is the wireless terminal 3a based on the destination possibility data included in the service information in response to the instruction from the controller.

After instructing the destination possibility determining part 32, the controller checks the determination result by the destination possibility determining part 32 (step S1402). If the destination possibility determining part 32 determines that there is not the destination possibility that the destination of the service information is the wireless terminal 3a, the controller exits the processing. If the destination possibility determining part 32 determines that there is the destination possibility that the destination of the service information is the wireless terminal 3a, the controller instructs the destination determining part 33 to determine whether the destination of the service information is the wireless terminal 3a or not (step S1403). The destination determining part 33 in response to the instruction from the controller determines whether the destination of the service information is the wireless terminal 3a or not based on the request information included in the service information. If the request information included in the service information agrees with the request information transmitted to the information providing apparatus 1, it is determined that the destination of the service information is the wireless terminal 3a. If not, it is determined that the destination of the service information is not the wireless terminal 3a.

After instructing the destination determining part 33, the controller checks the determination result by the destination determining part 33 (step S1404). If the destination determining part 33 determines that the destination of the service information is not the wireless terminal 3a, the controller exits the processing. If the destination determining part 33 determines that the destination of the service information is the wireless terminal 3a, the controller instructs the service information processing part 34 to provide a display showing the received service information (step S1405). The service information processing part 34 provides a display showing the received service information in response to the instruction from the controller.

In this way, in the wireless network system of the second embodiment, a wireless terminal includes the sender possibility data in request information and transmits the request information to a wireless network. The information providing apparatus 1 determines the wireless terminal having the possibility of the sender of the request information based on the sender possibility data included in the received request information. Then, the information providing apparatus 1 includes the destination possibility data in the service information requested by the request information and transmits the service information to the wireless network by broadcasting. The wireless terminal having received the service information from the information providing apparatus 1 determines the destination possibility that the destination of the received service information is the wireless terminal based on the destination possibility data included in the received service information. A Bloom Filter obtained by performing the function transformation processing on an address of the wireless terminal is used for the creation of the sender possibility data and destination possibility data. A Bloom Filter is characterized in that the address of a wireless terminal cannot be specified from the value of the Bloom Filter itself. Therefore, it is difficult to specify a wireless terminal, which is the destination, from request information and service information. Furthermore, since the sender possibility data included in request information has different values every time, it is difficult to specify the sender of request information.

Notably, while the sender possibility data and destination possibility data here are a Bloom Filter obtained by performing the function transformation processing on the address of a wireless terminal, which is the destination of service information, the sender possibility data and destination possibility data are not limited thereto. Having described here the example in which the information providing apparatus 1 transmits service information to a wireless network by broadcasting, the invention is not limited thereto. The information providing apparatus 1 may transmit service information to a relay or relays by unicasting or multicasting and distribute service information received by the relay or relays.

As described above, according to the wireless network system of the invention, an information providing apparatus includes destination possibility data in service information and transmits the service information to a wireless network, and a wireless terminal determines the destination possibility that the destination is the wireless terminal based on the destination possibility data containing the received service information. Therefore, the leak of information such as an address of the wireless terminal can be prevented.

This application is based on Japanese Patent Application No. 2007-110143 which is hereby incorporated by reference.

What is claimed is:

1. A wireless network system, comprising:
an information providing apparatus that provides service information over a wireless network, the provided service information being associated with a destination wireless terminal; and
multiple wireless terminals each of which receives the provided service information from the information providing apparatus,
wherein:
the information providing apparatus creates destination possibility data by a function transformation processing of an address of the destination wireless terminal, creates destination identification data by encoding the address of the destination wireless terminal, and adds said destination possibility data and said destination identification data to the service information so that the provided service information includes said destination possibility data and said destination identification data; and
each wireless terminal includes:
a destination possibility determining part that determines whether there is a destination possibility that the destination wireless terminal associated with the provided service information is each wireless terminal itself, based on the destination possibility data included in the provided service information;
a destination determining part that determines, when the destination possibility determining part determines that there is the destination possibility, whether the destination wireless terminal is each wireless terminal itself, based on the destination identification data included in the provided service information; and
a service information processing part that displays the provided service information when said destination determining part determines that the destination wireless terminal is each wireless terminal itself.

2. The wireless network system according to claim 1, wherein the destination possibility data is a Bloom Filter obtained by performing the function transformation processing on terminal identification data representing the destination wireless terminal, which is the destination of the provided service information.

3. The wireless network system according to claim 2, wherein the Bloom Filter is obtained by preparing a bit array, calculating hash values using the address of the destination wireless terminal, setting bits of a bit array indicated by the hash values to "1", and each time setting a bit arbitrarily selected from the bit array to "1".

4. The wireless network system according to claim 3, wherein said information providing apparatus maintains a private key and determines whether said information providing apparatus itself is a destination of data, based on the private key.

5. The wireless network system according to claim 3, wherein each wireless terminal owns a private key and determines whether each wireless terminal itself is a destination of data, based on the private key.

6. The wireless network system according to claim 1, wherein:
each wireless terminal as a requesting wireless terminal adds sender possibility data corresponding to each wireless terminal itself to request information representing requested service information; and
the information providing apparatus adds destination possibility data corresponding to the requesting wireless terminal, which is the sender of the request information, to the requested service information represented by the request information.

7. The wireless network system according to claim 6, wherein the destination possibility data corresponding to the requesting wireless terminal is the sender possibility data included in the request information.

8. The wireless network system according to claim 6, wherein:
the requesting wireless terminal adds terminal identification data indicating the requesting wireless terminal to the request information; and
the information providing apparatus further includes:
a sender possibility determining part that determines whether there is a possibility that each wireless terminal is the sender of the request information, based on the sender possibility data included in the request information; and a sender determining part that determines, when the sender possibility determining part determines that there is a possibility that a particular wireless terminal is the sender of the request information, whether the particular wireless terminal is the sender of the request information, based on the terminal identification data included in the request information.

9. The wireless network system according to claim 1, further comprising at least one relay that relays an exchange of data between the information providing apparatus and the wireless terminals.

10. A wireless terminal that receives service information provided from an information providing apparatus, the provided service information being associated with a destination wireless terminal and including destination possibility data and destination identification data, the wireless terminal comprising:
a destination possibility determining part that determines whether there is a destination possibility that the destination wireless terminal associated with the provided service information is the wireless terminal itself, based on the destination possibility data included in the provided service information;
a destination determining part that determines, when the destination possibility determining part determines that there is the destination possibility, whether the destination wireless terminal is the wireless terminal itself, based on the destination identification data included in the service information; and
a service information processing part that displays the provided service information when said destination determining part determines that the destination wireless terminal is the wireless terminal itself.

11. The wireless terminal according to claim 10, wherein sender possibility data corresponding to the wireless terminal is included in request information representing requested service information.

12. The wireless terminal according to claim 11, wherein terminal identification data representing the wireless terminal is included in the request information.

13. A wireless network system, comprising:
an information providing apparatus that provides service information over a wireless network, the provided service information being associated with a destination wireless terminal; and
multiple wireless terminals each of which receives the provided service information from the information providing apparatus,
wherein:
the information providing apparatus creates destination possibility data by a function transformation processing of an address of the destination wireless terminal, creates destination identification data by encoding the address of the destination wireless terminal, and adds said destination possibility data and said destination identification data to the service information so that the provided service information includes said destination possibility data and said destination identification data; and
each wireless terminal includes:
destination possibility determining means for determining whether there is a destination possibility that the destination wireless terminal associated with the provided service information is each wireless terminal itself, based on the destination possibility data included in the provided service information;
destination determining means for determining, when the destination possibility determining means determines that there is the destination possibility, whether the destination wireless terminal is each wireless terminal itself, based on the destination identification data included in the service information; and
service information processing means for displaying the provided service information when the destination possibility determining means determines that said destination determining means determines that the destination wireless terminal is each wireless terminal itself.

14. The wireless network system according to claim 13, wherein the destination possibility data is a Bloom Filter obtained by performing the function transformation processing on terminal identification data representing the destination wireless terminal, which is the destination of the provided service information.

15. The wireless network system according to claim 14, wherein the Bloom Filter is obtained by preparing a bit array, calculating hash values using the address of the destination wireless terminal, setting bits of a bit array indicated by the hash values to "1", and each time setting a bit arbitrarily selected from the bit array to "1".

16. The wireless network system according to claim 15, wherein said information providing apparatus maintains a private key and determines whether said information providing apparatus itself is a destination of data, based on the private key.

17. The wireless network system according to claim 15, wherein said wireless terminal owns a private key and determines whether said wireless terminal itself is a destination of data, based on the private key.

18. The wireless network system according to claim 13, wherein:
each wireless terminal as a requesting wireless terminal adds sender possibility data corresponding to each wireless terminal itself to request information representing requested service information; and
the information providing apparatus adds destination possibility data corresponding to the requesting wireless terminal, which is the sender of the request information, to the requested service information represented by the request information.

19. The wireless network system according to claim 18, wherein the destination possibility data corresponding to the requesting wireless terminal is the sender possibility data included in the request information.

20. The wireless network system according to claim 18, wherein:
the requesting wireless terminal adds terminal identification data indicating the requesting wireless terminal to the request information; and
the information providing apparatus further includes:
sender possibility determining means for determining whether there is a possibility that each wireless terminal is the sender of the request information, based on the sender possibility data included in the request information; and
sender determining means for determining, when the sender possibility determining means determines that there is a possibility that a particular wireless terminal is the sender of the request information, whether the particular wireless terminal is the sender of the request information, based on the terminal identification data included in the request information.

21. The wireless network system according to claim 13, further comprising at least one relay that relays an exchange of data between the information providing apparatus and the wireless terminals.

22. A wireless terminal that receives service information provided from an information providing apparatus, the provided service information being associated with a destination wireless terminal and including destination possibility data and destination identification data, the wireless terminal comprising:

destination possibility determining means for determining whether there is a destination possibility that the destination wireless terminal associated with the provided service information is the wireless terminal itself, based on the destination possibility data included in the provided service information;

destination determining means for determining, when the destination possibility determining means determines that there is the destination possibility, whether the destination wireless terminal is the wireless terminal itself, based on the destination identification data included in the service information; and service information processing means for displaying the provided service information when said destination determining means determines that the destination wireless terminal is the wireless terminal itself.

23. The wireless terminal according to claim 22, wherein sender possibility data corresponding to the wireless terminal is included in request information representing requested service information.

24. The wireless terminal according to claim 23, wherein terminal identification data representing the wireless terminal is included in the request information.

* * * * *